(12) United States Patent
Keiser et al.

(10) Patent No.: US 9,680,903 B1
(45) Date of Patent: Jun. 13, 2017

(54) DELIVERY OF VIDEO MAIL TO CONTROLLED-ENVIRONMENT FACILITY RESIDENTS VIA PODCASTS

(71) Applicant: Securus Technologies, Inc., Dallas, TX (US)

(72) Inventors: Luke Keiser, Frisco, TX (US); Michael Cattolico, Kirkland, WA (US)

(73) Assignee: Securus Technologies, Inc., Carrollton, TX (US)

( * ) Notice: Subject to any disclaimer, the term of this patent is extended or adjusted under 35 U.S.C. 154(b) by 257 days.

(21) Appl. No.: 14/678,596

(22) Filed: Apr. 3, 2015

(51) Int. Cl.
*H04L 29/08* (2006.01)
*H04L 29/06* (2006.01)
*H04L 12/18* (2006.01)
*H04M 3/42* (2006.01)

(52) U.S. Cl.
CPC ........ *H04L 65/608* (2013.01); *H04L 12/1818* (2013.01); *H04L 67/06* (2013.01); *H04L 67/1095* (2013.01); *H04M 3/42* (2013.01); *H04M 3/42229* (2013.01)

(58) Field of Classification Search
CPC .. H04M 3/42; H04M 3/42229; H04L 12/1818
See application file for complete search history.

(56) References Cited

U.S. PATENT DOCUMENTS

| | | | | |
|---|---|---|---|---|
| 7,519,169 B1 * | 4/2009 | Hingoranee | ...... | H04M 3/42068 379/114.13 |
| 7,529,357 B1 * | 5/2009 | Rae | ........................ | H04M 3/38 370/261 |
| 7,804,941 B2 * | 9/2010 | Keiser | ................. | H04L 12/5835 379/114.2 |
| 8,832,374 B1 * | 9/2014 | Schaefers | ........... | H04L 67/1097 711/115 |
| 8,929,525 B1 * | 1/2015 | Edwards | ................. | H04N 7/147 348/14.01 |
| 9,026,468 B2 * | 5/2015 | Martinez | ................. | G06Q 30/04 379/114.13 |
| 9,094,500 B1 * | 7/2015 | Edwards | ............. | H04M 3/2281 |
| 9,113,131 B1 * | 8/2015 | Passe | ....................... | H04M 3/38 |
| 9,380,082 B1 * | 6/2016 | Keiser | .................... | H04N 7/181 |
| 9,420,094 B1 * | 8/2016 | Keiser | ................. | H04M 3/4365 |
| 9,479,651 B1 * | 10/2016 | Welker-Muraguri | . | H04M 15/08 |
| 2008/0137831 A1 * | 6/2008 | Khorsandi | .............. | H04M 3/56 379/202.01 |
| 2008/0189391 A1 * | 8/2008 | Koberstein | ............. | H04L 67/26 709/218 |

(Continued)

*Primary Examiner* — Lashonda Jacobs
(74) *Attorney, Agent, or Firm* — Fogarty LLP (57) ABSTRACT

Delivery of video to controlled-environment facility residents via podcasts may include accepting a digital video file or series of digital image files, such as from a non-resident, indicated as directed to a resident of the controlled-environment facility. Such video or image files may be uploaded, such as by the non-resident, via a provided user interface. The video file or series of digital image files are converted into a podcast. The podcast is cached in controlled-environment facility content server storage and the resident is notified of availability of the podcast. The podcast may be streamed and/or downloaded, within the controlled-environment facility, to one of the controlled-environment facility resident media devices.

24 Claims, 4 Drawing Sheets

(56) References Cited

U.S. PATENT DOCUMENTS

| | | | |
|---|---|---|---|
| 2009/0204402 A1* | 8/2009 | Marwaha | G06Q 10/10 704/260 |
| 2009/0228383 A1* | 9/2009 | Martinez | G06Q 30/04 705/35 |
| 2009/0264111 A1* | 10/2009 | Bernard | H04L 67/04 455/414.3 |
| 2012/0257583 A1* | 10/2012 | Keiser | H04L 65/4076 370/329 |
| 2014/0267540 A1* | 9/2014 | Torgersrud | H04N 7/147 348/14.01 |

* cited by examiner

DELIVERY OF VIDEO MAIL TO CONTROLLED-ENVIRONMENT FACILITY RESIDENTS VIA PODCASTS

TECHNICAL FIELD

This disclosure relates generally to delivering video mail to residents of a controlled-environment facility, more particularly to delivering video mail to controlled-environment resident media devices, and specifically to the caching and delivery of video mail files to controlled-environment facility resident media devices as podcasts.

BACKGROUND

According to the International Centre for Prison Studies, the United States has the highest prison population per capita in the world. In 2009, for example, 1 out of every 135 U.S. residents was incarcerated. Generally, inmates convicted of felony offenses serve long sentences in prison (e.g., federal or state prisons), whereas those convicted of misdemeanors receive shorter sentences to be served in jail (e.g., county jail). In either case, while awaiting trial, a suspect or accused may remain incarcerated. During his or her incarceration, an inmate may have opportunities to communicate with the outside world.

By allowing prisoners to have some contact with friends and family while incarcerated, the justice system aims to facilitate their transition back into society upon release. Traditional forms of contact include telephone calls, in-person visitation, conjugal visits, etc. More recently, technological advances have allowed jails and prisons to provide other types of communication, including individual-to-individual video conferences and online chat sessions.

Traditional communication services provided to residents of controlled-environment facilities (such as correctional facilities) may include allowing residents (inmates) to place outbound phone calls to non-residents. Additionally, non-residents can typically schedule video visitation with residents (inmates) of the controlled-environment facility. Other types of communication available to controlled-environment residents include the ability to exchange email and prerecorded text messages between residents and non-residents of the controlled-environment facility.

To enable these various types of communications, a jail or prison may install communication devices in different parts of the facility. Such communication devices are dedicated to provide inmate contact with the outside world. These devices are located in different areas throughout the facility. Traditionally, controlled-environment facility communication vendors have provided services that allow residents of a controlled-environment facility to initiate phone calls. This is typically referred to as an inmate outbound call. Alternatively, non-residents of a controlled-environment facility can pay for a scheduled video visitation event to occur where both the resident and the non-resident log into a video visitation application at the scheduled time to have a video conversation.

Typically residents of controlled-environment facilities, particularly controlled-environment facilities such as correctional institutions, are not allowed access to streaming content. Similarly, unrestricted or untethered access to wireless data communication systems is not typically allowed, such as for security reasons. That is to say, typically, there are security concerns in a controlled-environment facility that result in a need for tightly controlled media. Regardless, the cost of streamed or downloaded data, particularly in the form of media files, data plan limits, and/or the cost of bandwidth to download or stream such files, may be a concern. Moreover, the layout of a controlled-environment facility, such as the use or radiating pods in modern correctional facilities, and/or the structure of the facility itself, such as the use of steel and/or steel-reinforced concrete in correctional facilitates, make the propagation of a wireless signal for streaming, or even downloading, difficult and/or unpredictable.

SUMMARY

The present invention is directed to systems and methods which provide video mail distribution to controlled-environment facility residents. Therein, a plurality of controlled-environment facility resident media devices are disposed within a controlled-environment facility. A controlled-environment facility content server accepts a digital video file or series of digital image files from, by way of example a non-resident (such as a friend, family member, facility administrator or staff, an attorney, a bail bondsman, or the like). This video or images are indicated as directed to a resident of the controlled-environment facility. A network connection links the controlled-environment facility content server to equipment used, such as non-resident user equipment, to upload the digital video and/or series of digital image files for acceptance by the controlled-environment facility content server.

To this end, in various embodiments of the present systems and methods, a non-resident may be presented a user interface and such embodiments may receive a selection by the non-resident, via the user interface, to send video mail to the resident of the controlled-environment facility. Thereupon, the non-resident may be provided, via the user interface, a selection to either upload a video or image or to capture a video or image, and selection by the non-resident, via the user interface, to upload the video or image or to capture the video or image may then be accepted. In response to selection by the non-resident to upload a video or image file, the non-resident is provided, via the user interface, a file selection interface to enter a video or image filename and/or browse for a video or image file. Conversely, in response to selection by the non-resident to capture a video or image, the non-resident is provided, via the user interface, a video or image capture interface and the video or image file is captured, via the video or image capture interface. Thereafter, the selected or recorded video or image file is uploaded for acceptance by the controlled-environment facility content server, or the like.

The video file or series of digital image files is converted into a podcast and cached in controlled-environment facility content server storage, or the like. The resident is notified of availability of the podcast and the podcast is streamed and/or downloaded, within the controlled-environment facility, to one of the controlled-environment facility resident media devices. The notification may present the podcast to the resident as a podcast "episode."

Connectivity from the controlled-environment facility content server to the controlled-environment facility resident media devices within the controlled-environment facility is used to stream and/or download the podcasts to the controlled-environment facility resident media device. This connectivity may include a local area network, wherein Wi-Fi connectivity from a wireless access point disposed in a portion of the controlled-environment facility provides access by controlled-environment facility resident media devices disposed in that portion of the controlled-environment facility. In accordance with embodiments of the present systems and methods, structure of the controlled-environment facility, directionality of Wi-Fi signals, and/or signal strength of the Wi-Fi signals limits Wi-Fi connectivity from the wireless access point disposed in a portion of the controlled-environment facility to provides access by controlled-environment facility resident media devices disposed only in that portion of the controlled-environment facility. Where, in accordance with such embodiments, the controlled-environment facility is a correctional facility, the portion of the correctional facility may be a cellblock, pod, common area, outdoor yard, cafeteria, or exercise facility.

In accordance with some embodiments of the present systems and methods, the controlled-environment facility content server, or the like may determine whether the resident is allowed access to the podcast prior to notifying the resident of the availability of the podcast and/or streaming and/or downloading the podcast. In response to a determination that the resident is allowed access to the podcast, notification to the resident of the availability of the podcast and/or streaming and/or downloading of the podcast may proceed. Additionally or alternatively, the resident media device may determine whether the resident is allowed to access the podcast, prior to allowing access to the podcast by the resident on the resident media device, in some embodiments. Further, the resident media device may allow access to the podcast upon application of security measures, by the resident media device, with respect to the podcast. Such security measures with respect to the podcast may include determining by the resident media device DNS spoofing, DNS redirection, use of proxy servers for privacy and security, biometric validation, password validation, and/or the like.

The controlled-environment facility content server may delete the podcast from the controlled-environment facility content server following successful streaming and/or downloading of the podcast to the resident media device. Additionally or alternatively, the resident media device may hide the podcast on the resident media device, or delete the podcast from the resident media device, following viewing of the podcast by the resident on the resident media device.

In various embodiments, one or more of the techniques described herein may be performed by one or more computer systems. In other various embodiments, a tangible computer-readable storage medium may have program instructions stored thereon that, upon execution by one or more computer systems, cause the one or more computer systems to execute one or more operations disclosed herein. In yet other various embodiments, one or more systems may each include at least one processor and memory coupled to the processor(s), wherein the memory is configured to store program instructions executable by the processor(s) to cause the system(s) to execute one or more operations disclosed herein.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

Having thus described the invention in general terms, reference will now be made to the accompanying drawings, which are not necessarily drawn to scale, and wherein:

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the spirit and scope of the claims. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

For example, various types of controlled-environment facilities are present in today's society, and persons may be voluntary or involuntary residents of such facilities, whether temporarily or permanently. Examples of controlled-environment facilities may include correctional institutions (e.g., municipal jails, county jails, state prisons, federal prisons, military stockades, juvenile facilities, detention camps, home incarceration environments, etc.), healthcare facilities (e.g., hospitals, nursing homes, mental health facilities, rehabilitation facilities, such as drug and alcohol rehabilitation facilities, etc.), restricted living quarters (e.g., hotels, resorts, camps, dormitories, barracks, etc.), and the like. For convenience of explanation, various examples discussed herein are presented in the context of correctional facilities, or the like. For instance, in some of the embodiments discussed below, a controlled-environment facility may be referred to as a correctional facility, jail or prison, and its residents may be referred to as inmates, arrestees, or detainees. It should be understood, however, that the systems and methods described herein may be similarly applicable to other types of controlled-environment facilities and their respective residents (e.g., a hospital and its patients, a school dormitory and its students, etc.).

Embodiments of the present systems and methods relate to delivering video mail to residents of a controlled-environment facility, more particularly relate to delivering video mail to controlled-environment resident media devices, and specifically relate to the caching and delivery or distribution of video mail files to controlled-environment facility resident media devices, as podcasts. In accordance with embodiments of the present systems and methods, delivery of video mail to controlled-environment facility residents via podcasts may include accepting a digital video file or series of digital image files, such as from a non-resident (e.g. a friend, family member, facility administrator or staff, an attorney, a bail bondsman, or the like). These files may be indicated as directed to, or otherwise "addressed to," a resident of the controlled-environment facility, as video mail. Such video or image files may be uploaded, such as by a non-resident, via a provided user interface. The video file or series of digital image files are then converted into a podcast. The podcast is cached in controlled-environment facility content server storage and the resident is notified of availability of the podcast "episode." The podcast may be streamed and/or downloaded, within the controlled-environment facility, to the controlled-environment facility resident's media device.

Hence, in accordance with embodiments of the present systems and methods, video mail may be distributed to residents of controlled-environment facilities via podcasting. A video mail message from a friend or family member, a facility staff member, or the like may be recorded and stored, such as in a virtual mailbox. Transfer and storage of the video mail may act as a caching of the video mail, such that the video mail may be uploaded to a resident media device, such as a resident tablet computing device, media player, or the like, which is adapted and/or approved for use in the resident's controlled-environment facility. While using the resident media device the resident may receive a message or notification that a new podcast, containing video mail is available, which the resident may then open. In accordance with some embodiments of the present systems and methods, following viewing of a video mail the video mail may be hidden from the resident on his or her device and/or deleted from server and/or resident device.

Figure 1:
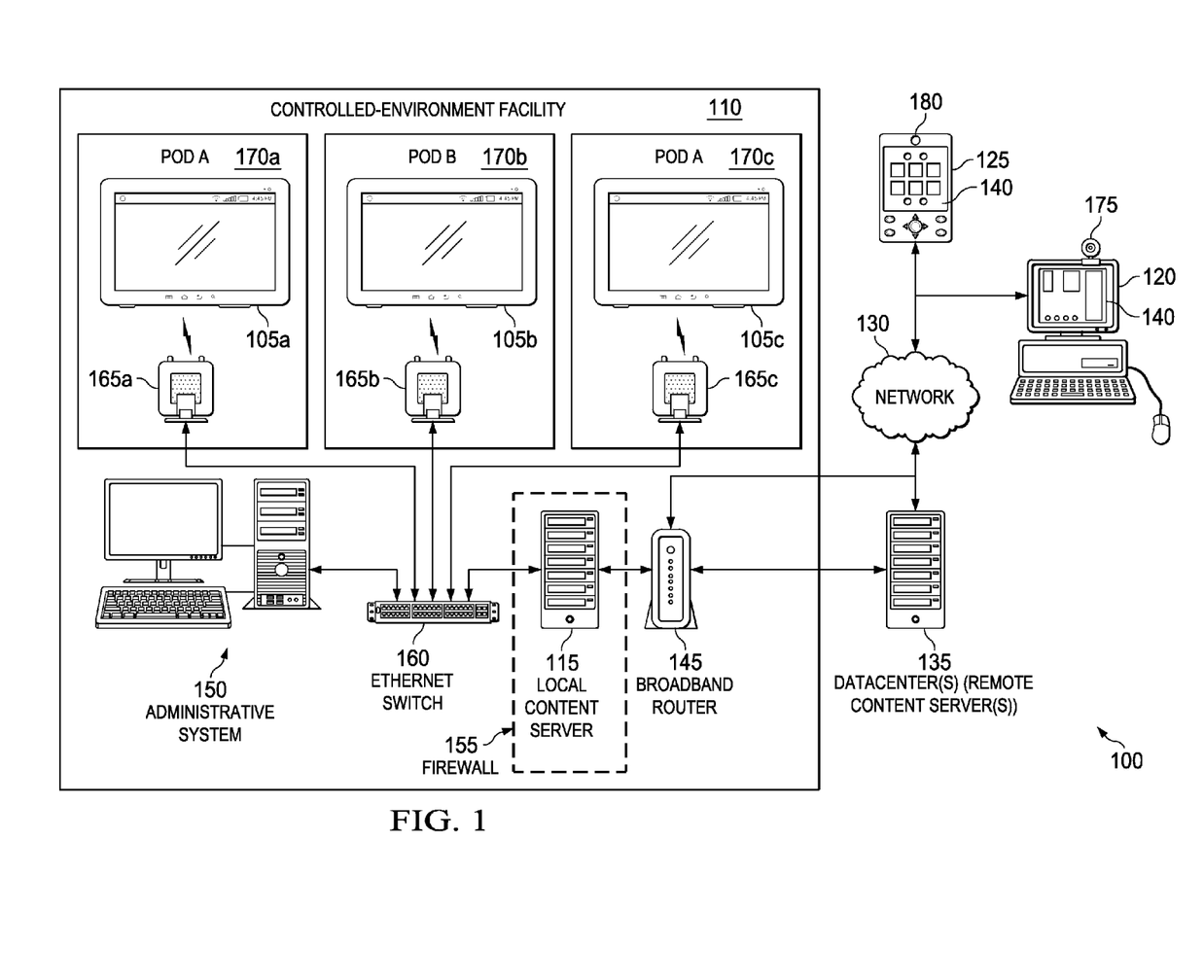
FIG. 1 is a diagrammatic environmental illustration of an example of the present system for delivery of video mail to resident media devices in controlled-environment facilities, deployed in conjunction with a controlled-environment facility, according to some embodiments.

FIG. 1 is a diagrammatic environmental illustration of an example of an embodiment of the present system 100 for delivery of video mail to resident media devices 105 in controlled-environment facilities, deployed in conjunction with controlled-environment facility 110, according to some embodiments. Illustrated embodiment of controlled-environment facility digital media distribution system 100 includes controlled-environment facility local content server 115 that stores content, such as podcasts, and the like. In accordance with embodiments of the present systems and methods, video mail may be provided to, by way of example local content server 115, from a device, such as non-resident computer 120 or non-resident media device 125 (e.g. a non-resident's smartphone, tablet computing device, media player, etc.) An "outward facing" network connection links controlled-environment facility local content server 115 to devices, such as non-resident computer 120 or non-resident media device 125, and/or the like, such as via network 130. Network 130 may include one or more networks, such as the Internet, an intranet, or any other type of data network suitable for allowing transfer of digital media to local content server 115 and/or datacenter 135. Datacenter 135, which, as illustrated, may be external to controlled-environment facility 110, may, in accordance with some embodiments of the present systems and methods, act as, or provide functionality to act as, a remote content server, such as in place of, or in addition to, local content server 115. Datacenter 135 may, alternatively or additionally, act as a network server or the like providing (web-based) user interface 140 to user devices, such as non-resident computer 120, non-resident media device 125, and/or the like, for a user, such as a non-resident, to upload digital videos, digital images, audio files, and/or the like, as video mail.

Local content server 115 may receive and process video mail, or the like from user devices, such as non-resident computer 120, non-resident media device 125, and/or the like, via network 130, passing through controlled-environment facility network connectivity, such as broadband router 145 either directly from the user device (e.g. non-resident computer 120, non-resident media device 125, and/or the like) or through datacenter 135. Datacenter 135 may receive and process the video mail from the user device (e.g. non-resident computer 120, non-resident media device 125, and/or the like), in accordance with embodiments of the present systems and methods where datacenter 135 acts as a remote content server. As a part of processing, of the received video mail, such uploaded video, images, or the like may, generally upon receipt, be converted into a resident-accessible podcast for streaming and/or downloading to resident media devices, in a manner conforming to requirements of controlled-environment facility 110 (i.e. my apply security and/or controls to the video mail prior to and delivery). Such podcasts can be serialized and/or may be presented to the resident as a podcast "episode." Further, videos or the like, such as from a facility administrator, facility staff, or the like might include content from the facility, or the like, such as videos to provide educational podcasts (e.g. "how to" podcasts) Prison Rape Elimination Act (PREA) information videos, postcasts, resident handbook-related videos, or the like.

Administrative system 150 may be a controlled-environment facility management system or functionality, such as a Jail Management System (JMS), or the like in correctional institution embodiments. Regardless, administrative system 150 may provide administration over whether a particular resident can view video mail sent to him or her, or the like. These security and/or control rules may be enforced by local content server 115 (and/or datacenter 135). Hence, in various embodiments, controlled-environment facility content server 115 or 135 may determine whether the resident is allowed access to video mail and streams or downloads the content to the resident media device in response to a determination that the resident is allowed access to video mail. To this end, the controlled-environment facility local content server may access administrative system 150 to determine whether the resident is allowed access to video mail. Hence, security and other controls of provisioning of video mail to a (particular) resident can be implemented at the time of distribution of the video mail to the resident, within the controlled-environment facility. In this manner, latest restrictions, or the like, imposed on a resident can be enforced with respect to the video mail (podcast) resident. In accordance with some embodiments, a facility administration or other authority may decide which images in a series of images and/or what portion, if any, of a video the addressee resident may access. For example a podcast such as described above may include only some of the summited images, and/or only a portion the submitted video. Additionally or alternatively, security and other controls for access to video mail by a (particular) resident can be implemented at the time of selection by the (non-resident) user to send the resident a video mail, upon receipt of the video mail from the use's device (e.g. non-resident computer 120, non-resident media device 125, or the like, such as prior to conversion of the video mail to a podcast, and/or the like.

In accordance with various embodiments of the present systems and methods, administrative system 150 and controlled-environment facility local content server 115 may be located at, or in, facility 110, as illustrated in FIG. 1. However, either of controlled-environment facility local content server 115 or administrative system 150 may be combined (such as with other facility management systems), and/or located at a central location outside of the facility, disposed in a decentralized manner at several locations, or otherwise located and/or combined so as to receive or provide data communications, in accordance with the present systems and methods. As but one example, controlled-environment facility local content server 115 (and/or administrative system 150) may be a part of, co-housed with, or co-hosted with, datacenter 135, so as to provide the aforementioned remote content server.

Further, controlled-environment facility local content server 115 may be isolated by firewall 155, and/or otherwise act as a firewall, such as to afford an ability to quarantine and examine incoming digital media files, such as video mail, and and/or to ensure control over access to the digital media files until the determination as to whether the intended resident recipient is allowed access to this content. For example, some downloaded content could include malware, rogue content information, or the like, which would not be approved by the content server. Access to such content may be denied, or the content may otherwise be made appropriate for downloading or streaming to the intended resident. For example, embedded inappropriate hyperlinks may be redirected via appropriate DNS redirection security measures, or the like.

Inward facing connectivity from and to controlled-environment facility local content server 115 extends from and to controlled-environment facility resident media devices 105a-105c, such as via Ethernet switch 160 and wireless access points 165a-c. Such connectivity may be used to notify residents of available video mail (podcasts) and afford streaming and/or downloading of the video mail (podcasts) in accordance with embodiments of the present systems and methods. As noted, The controlled-environment facility resident media devices 105 may be tablet computing devices, smartphones, media players, or the like adapted and/or approved for use by residents of controlled-environment facility 110 (within controlled-environment facility 110), as discussed in greater detail below. Local content server 115, which may be referred to as a local platform, or the like, and/or datacenter 135, acting as a content server, may provide content caching, such as the aforementioned storing of incoming video mail and/or podcasts created from such video mail, or the like. Such caching can promote balanced streaming and/or downloading of content, such as video mail podcasts, to resident/inmate tablet devices 105a-c and/or provide for downloading, as resident/inmate tablet device access to Wi-Fi coverage allows and/or when a resident/inmate tablet device is interfaced with a communications kiosk, intelligent facility video phone device, and/or the like.

As noted, communications to or from resident media devices is carried out via local network connectivity, such as via Ethernet switch 160 and wireless access points 165a-c. Such, access points may be dedicated wired or wireless access points, such as a Wi-Fi router or the like, as illustrated. However, alternatively or additionally, communications kiosks, intelligent facility devices (such as specially adapted videophones, mounted and hardened common use tablet computing devices, etc.), and/or the like, may act as wireless and/or wired access points 165a-c for resident/inmate tablet devices 105a-c. Regardless, the internal controlled-environment facility connectivity may include Wi-Fi connectivity, and in such embodiments a local area network employing the Wi-Fi connectivity may include wireless access points 165a-c, each disposed in corresponding portion 170a-c of the controlled-environment facility to provide access by controlled-environment facility resident media devices disposed in that portion of the controlled-environment facility. For example, where the controlled-environment facility is a correctional facility, the portion of the correctional facility may be a cellblock, pod or common area, such as laundry room, the yard (outside) dayroom cafeteria, exercise facilities or the like. So in a correctional facility embodiment, a local area network employing the Wi-Fi connectivity may employ wireless access point 165a disposed in pod 170a of correctional facility 110 to provide access by inmate media device 105a, also disposed in pod 170a. Moreover, due to the nature of the construction (e.g., steel, steel-reinforced concrete, or the like) and/or layout (e.g. radiating pod structure, or the like) of a correctional facility, coverage from a particular wireless access point (165a), may, in accordance with embodiments of the present systems and methods, be contained to the pod (170a) in which it is installed, and hence only reach resident devices (105a) located in that pod (170a), and be isolated from devices (105b and 105c) in other pods (170b and 170c).

Streaming and/or downloading may be further compartmentalized by taking advantage of, or employing, antenna directionality of wireless access points 165a-c, signal strength, and/or the like. For example, an authorized transceiver power level may be determined for communicating with the user interface device in response to a request. Additionally, such a system or method may dynamically set a transceiver power in response to the determination. As a further example, a secure network access point may include one or more antennas used for wirelessly communicating with a user interface device, such as resident media devices. The one or more antennas may be configured to communicate using a dynamically configurable power level. For example, the antenna may be configured to communicate within a first range at a first power level, within a second range at a second power level, and at a third range at a third power level. In addition the antenna and/or associated RF equipment may be shut off or filtered to terminate communications between the secure network access point and the user interface device. The antenna may be an omnidirectional antenna, a directional antenna, a beam-forming antenna, etc. In some embodiments, the first communication range may be within a few feet of a secure network access point, or even a few inches, requiring the resident to go to a location, such as a communications kiosk, resident phone, classroom, etc. to download and/or stream content. Further security measures may call for determining an authorized duration of network access for the user interface device.

Additionally, the method may include establishing a temporary network access session between the user interface device and the network for the authorized duration of network access, and/or temporary access key for network access.). In furtherance of these, or similar embodiments, the video mail podcast may only be available to stream or download from a particular location.

As noted, the controlled-environment facility resident media devices 105a-c may be tablet computing devices, smartphones, media players, or the like adapted and/or approved for use by residents of the controlled-environment facility (within the controlled-environment facility). Each resident media device 105 may be particularly adapted for use in a controlled-environment. For example, in a correctional institution, jail, or the like, such a resident media device may have a specially adapted operating system and/or may be "stripped-down," particularly from the standpoint of what applications programs (apps) and/or hardware are provided or allowed on resident media device 105, and/or connectivity afforded such a resident media device. For example, such a resident media device may employ an operating system kernel such one based upon an open source platform such as the CyanogenMod-based operating system, which may be rebuilt for use in such a resident media device in a controlled-environment facility. As a further example, the resident media device may be adapted to only connect to a network provided by the controlled-environment facility, and/or in only certain locations, within the controlled-environment facility, such as may be controlled by availability of Wi-Fi access, or the like, only being available in certain areas, as discussed above. That is, for example, where streaming and/or downloading may be compartmentalized, leveraging the structure of the controlled-environment facility for example limiting the availability of a Wi-Fi signal providing the stream through the placement of wireless access points, antenna directionality of such wireless access points, and/or the like. Also, the resident media device may have a few fixed apps pre-installed on the device, and installation of further apps on the device may be forbidden (i.e. prevented by modifications to the device's operating system, or the like) and/or restricted, such as by requiring permission from a facility administrator, or the like. Apps provided on resident media devices might include apps of particular interest to residents of the controlled-environment facility. For example, resident media devices provided to inmates of correctional facilities, might include apps that may be of particular use to an inmate, in general, such as access to a legal research service, or of more specific interest, such as providing an inmate nearing release, access to employment searching apps or the like. Hence, such inmate resident media devices may be used to help soon to be released inmates transition. For example, the resident media device may be used to communicate with a future employer, or the like. As such, resident media devices may be sponsored, or otherwise subsidized by organizations or companies, assisting with the transition of inmates into society.

Thus, with the implementation of various embodiments of the present systems, such as illustrated in FIG. 1 as controlled-environment facility video mail distribution system 100, a plurality of controlled-environment facility resident media devices 105 disposed within controlled-environment facility 110 may be employed for video mail distribution. In such embodiments controlled-environment facility content server 115 and/or 135, each of which may include at least one processor and memory coupled to the at least one processor, the memory is configured to store program instructions executable by the at least one processor. As a result of such programming, controlled-environment facility content server 115 or 135 accepts a digital video file or series of digital image files from a non-resident, such as from non-resident computer 120 and/or non-resident media device 125, as video mail, indicated as directed to (i.e. addressed to) a resident of controlled-environment facility 110. To this end, the non-resident may be offered interface 140 on non-resident device 120 or 125 to select and/or capture (using respective camera 175 or 180) video files, image files or the like. As mentioned, an outward facing network connection may link controlled-environment facility content server 115 or 135 to non-resident user equipment, such as non-resident computer 120 or non-resident media device 125. The digital video and/or series of digital image files may be uploaded from the non-resident user equipment 120 or 125 to the controlled-environment facility content server 115 or 135, over the network connection. To this end, this outward facing network connection may include broadband router 145 as well as network 130 connecting controlled-environment facility local content server 115 to user equipment 120 or 125, whereas network 130 may provide this link between datacenter 135, operating as a remote content server, and user equipment 120 or 125.

In embodiments of the present systems and methods, controlled-environment facility content server 115 or 135, or other functionality, converts the video file or series of digital image files into a podcast and caches the podcast in controlled-environment facility content server storage, such as on a hard-disk drive, solid-state drive, volatile or non-volatile storage. Above mentioned inward facing connectivity from and to controlled-environment facility local content server 115 extends from and to controlled-environment facility resident media devices 105a-105c, such as via Ethernet switch 160 and wireless access points 165a-c, while inward facing connectivity from datacenter 135, operating as a remote content server, and resident media devices 105a-105c may additionally include network 130 and broadband router 145, or the like.

Using such connectivity, controlled-environment facility content server 115 or 135, or other functionality (e.g. administrative system 150, or the like) notifies the resident to whom the video mail is addressed that the video mail podcast is available for streaming and/or downloading, as the case may be. Such streaming and/or downloading of the podcast may be restricted to taking place only within the controlled-environment facility to one of the controlled-environment facility resident media devices 105, i.e. to the addressee resident's media device. As mentioned controlled-environment facility content server 115 or 135 may, such as in conjunction with administrative system 150, or the like, determine whether the resident is allowed access to the video mail podcast. This determination may be made prior to notifying the resident of the availability of the podcast, and hence prior to streaming and/or downloading the podcast.

In accordance with embodiments of the present systems and methods, the podcast format for the video mail may be presented to the recipient resident as a new podcast "episode," or the like. As noted, the video mail podcast can be streamed on the resident's media device and/or downloaded thereto. Once downloaded a video may be selected for play, replay, archiving, etc. Rather than a video the podcast could be a slideshow of digital photos made from the aforementioned series of image files, which may be accompanied by audio, music or the like. Regardless, the podcast may be available to the resident on resident media device 105 while being on a separate phone, or while using a phone application on resident media device 105, so that the resident may discuss the video or slide show. In accordance with embodiments of the present systems and methods, the video mail podcast may be downloaded and saved on resident media device 105 for later presentation and sharing.

Following successful streaming and/or downloading of the podcast to the resident media device 105, respective controlled-environment facility content server 115 or 135 may delete the podcast from its storage. In some embodiments, alternative to, or in addition to such deletion of the video mail podcast from the content server, respective resident media device 105 may hide the podcast on the resident media device, and/or delete the podcast from the resident media device, following viewing of the podcast by the resident on the resident media device. Thereby, in accordance with various embodiments of the present systems and methods, the video mail can be moved off of server 115 or 135, i.e. downloaded to resident media device 105 and deleted from server 115 or 135, freeing storage space on the content server and/or datacenter.

In some embodiments, prior to allowing access to the podcast by the resident, respective resident media device 105 may determine whether the resident is allowed to access the podcast. Further, the respective resident media device may only allow access to the podcast upon application of security measures, by the resident media device, with respect to the podcast. For example, such security measures with respect to the podcast applied by the resident media device may include determining by the resident media device DNS spoofing detection, DNS redirection, use of proxy servers for privacy and security, biometric validation, and/or password validation.

Figure 2:
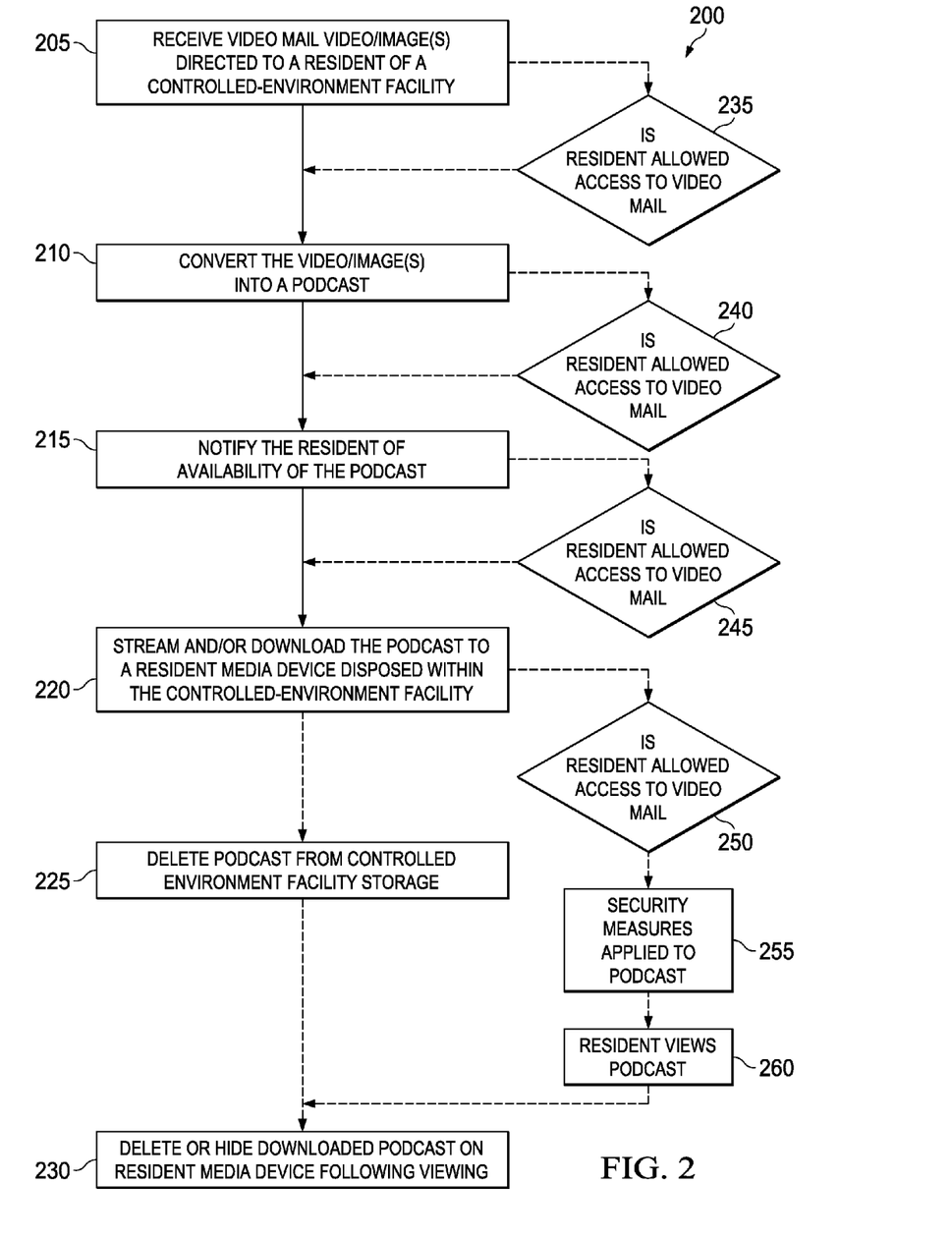
FIG. 2 is a flowchart of an example implementation of a process for delivering video mail to residents of controlled-environment facilities, according to some embodiments.

FIG. 2 is a flowchart of an example implementation of process 200 for delivering video mail to residents of controlled-environment facilities (110), according to some embodiments. Therein, a controlled-environment facility content server (115 or 135) receives a digital video file, series of digital image files, and/or the like, at 205, such as from a non-resident, facility staff, facility administrative system 150, etc. This video mail is in accordance with the present systems and methods indicated as directed to (i.e. addressed to) a resident of the controlled-environment facility. The video file or series of digital image files is converted into a podcast, such as by the controlled-environment facility content server (115 or 135), at 210. The podcast may be cached on the controlled-environment facility content server (115 or 135). At 215, the addressee resident is notified that the video mail podcast is available for viewing and/or download. This notification may present the podcast as a podcast episode. Thus, the resident may stream and/or download the podcast, at 220, within the controlled-environment facility, from the controlled-environment facility content server, such as to a controlled-environment facility resident media device disposed within the controlled-environment facility. This streaming and/or downloading may be carried out at 220, at least in part, via Wi-Fi employing wireless access points (155a-c), each wireless access point disposed within a portion of the controlled-environment facility and providing access by controlled-environment facility resident media devices disposed in that portion of the controlled-environment facility to streaming and/or downloading of content, such as video mail podcasts. In implementations where the controlled-environment facility is a correctional facility, such a portion of the correctional facility may be a particular cellblock, a particular pod, a common area, an outdoor yard, a cafeteria, an exercise facility, or the like.

In accordance with various implementations of the present systems and methods, following successful streaming and/or downloading of the podcast to the resident media device, the podcast may be deleted from the controlled-environment facility content server at 225. Moreover, at 230, the podcast, if downloaded, may be hidden from the resident, or deleted from the resident media device, following viewing of the podcast by the resident on the resident media device.

Also, in accordance with some implementations of the present systems and methods, sometime after receipt of the video mail at 205, but prior to notifying the resident that the video mail podcast is available and/or prior to downloading/streaming the podcast, the controlled-environment facility content server (115 or 135), and/or other functionality (such as administrative system 150), may determine, at 235, 240 or 245, whether the resident is allowed access to the video mail. If it is determined that the resident is allowed access to video mail, notification to the resident of the availability of the podcast may continue at 215, and/or streaming and/or downloading the podcast at 220 may be allowed. Alternatively or additionally, the resident media device may determine whether the resident is allowed access to the video mail, such as at 250, prior to allowing the resident to view the podcast on the resident media device at 260. Additionally or alternatively, the resident media device may only allow access to the podcast upon application of security measures with respect to the podcast by the resident media device at 255. Such security measures with respect to the podcast may include determining by the resident media device DNS spoofing detection, DNS redirection detection, use of proxy servers for privacy and security, biometric validation, password validation and reboot elimination.

Figure 3:
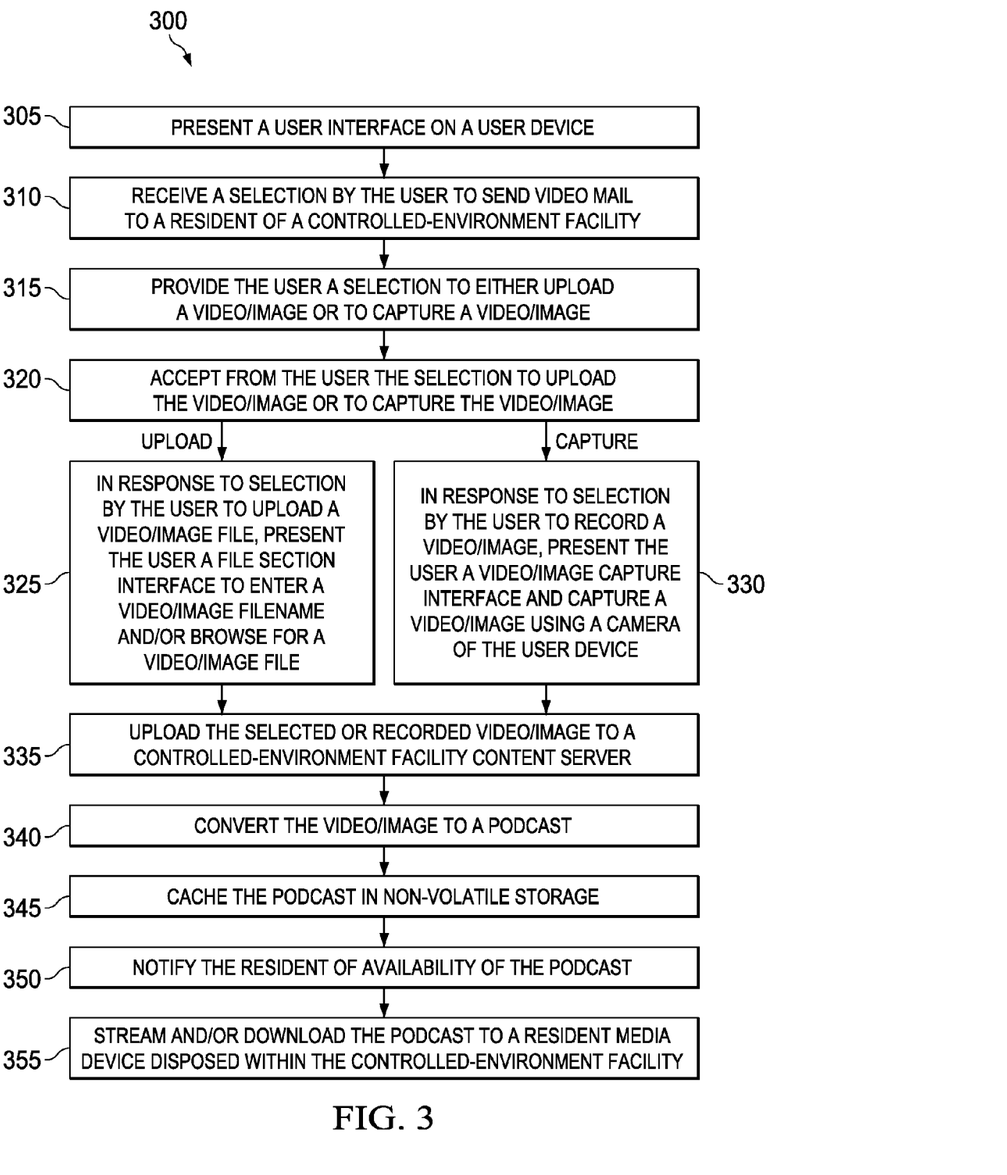
FIG. 3 is a flowchart of an example implementation of a process for collecting video mail and delivering the video mail to resident media devices in controlled-environment facilities, according to some embodiments.

As noted, the user (e.g. a non-resident, facility staff member, administrator, or the like) may be provided an interface for uploading videos, images or the like, such as video mail addressed to a resident of a controlled-environment facility. FIG. 3 is a flowchart of an example implementation of process 300 for collecting video mail and delivering the video mail to resident media devices in controlled-environment facilities, according to some implementations. Therein, a user, such as a non-resident, facility staff member, administrator, or the like, may be presented a user interface (140) at 305, such as on a non-resident device (120 or 125), or the like, which, as noted may be a personal computer or the like, or a personnel communications device such as a tablet computing device, smartphone, media player, or the like. The present systems and methods may receive a selection of the user at 310, via the user interface, to send video mail to a resident of a controlled-environment facility, whereupon the user may be offered, via the user interface at 315, a selection to either upload a video or image(s) or to capture a video or image(s). The present systems and methods may then, at 320, accept from the user the selection via the user interface to either upload the video or image(s), or to capture the video or image(s). In response to selection by the user to upload a video or image file, the user may be presented, via the user interface at 325, a file selection interface to enter a video or image filename and/or to browse for a video or image file. However, in response to selection by the user to capture a video or image(s), the user may, at 330 be presented a video or image capture interface, via the user interface for capturing the video or image(s), via the video or image capture interface, such as by using a camera (175 or 180) of the user device (e.g. non-resident device 120 or 125, respectively).

At 335, the selected or recorded video or image(s) may be uploaded to a controlled-environment facility content server (115 or 135). The uploaded video file or image files are converted into a podcast, In accordance with implementations of the present systems and methods at 340. At 345 the podcast is cached in volatile or non-volatile storage, such as in hard disk storage of the controlled-environment facility content server (115 or 135). Then at 350 the resident is notified of availability of the podcast and at 355 the podcast is streamed and/or downloaded to a controlled-environment facility resident media device disposed within the controlled-environment facility, such as in a manner discussed in greater detail above.

Hence, in accordance with embodiments of the present systems and methods, users may be able to upload videos for later viewing by the resident, such as at a time a discount would apply. For example, if the video is uploaded today and viewed tomorrow, a discount might apply. Alternatively or additionally, a discount might apply if the video is uploaded and/or downloaded at a time of low network traffic.

As also discussed above, security and authorization procedures may be applied before the notification and/or delivery of the podcast, and/or before the podcast may be viewed by the resident. As also discussed in greater detail above, after viewing, the podcast may be hidden on the resident device and/or deleted from the content server and/or resident device.

Figure 4:
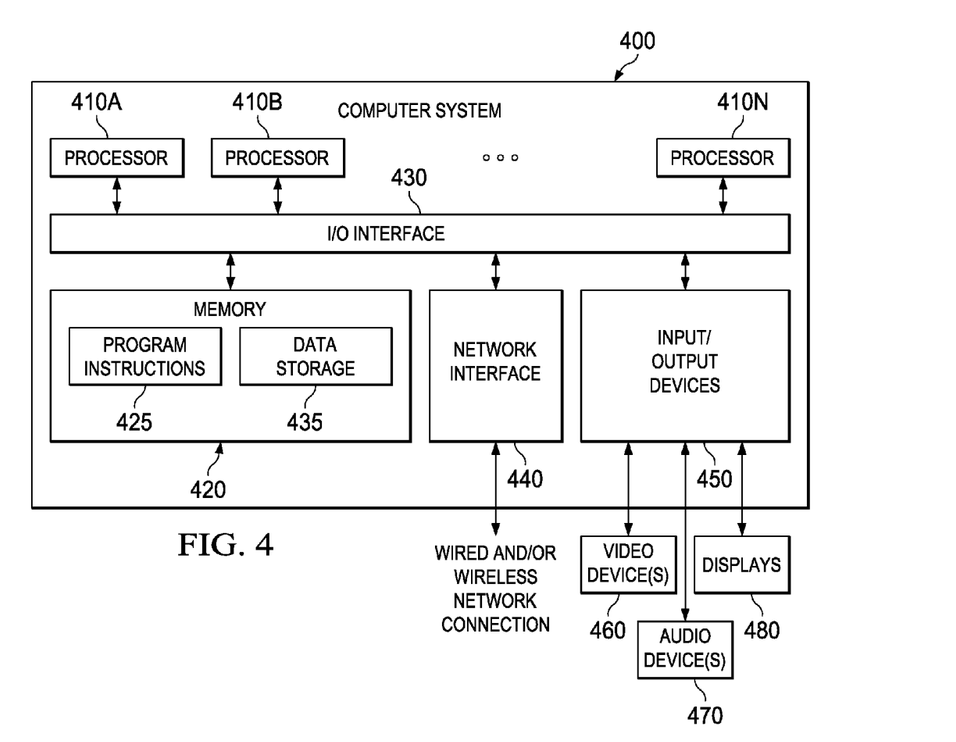
FIG. 4 is a block diagram of a computer system, device, station, or terminal configured to implement various techniques disclosed herein, according to some embodiments.

Embodiments of the present systems and methods for delivery of video mail to controlled-environment facility residents via podcasts, or the like, as described herein, may be implemented or executed, at least in part, by one or more computer systems. One such computer system is illustrated in FIG. 4. In various embodiments, computer system 400 may be a server, a mainframe computer system, a workstation, a network computer, a desktop computer, a laptop, a tablet computing device, media player, or the like. For example, in some cases, computer 400 may implement one or more steps of example processes 200, 300 and/or the like, such as described above with respect to FIGS. 1 through 3, and/or a computer system such as computer system 400 may be used as, or as part of, one or more of controlled-environment facility resident media devices 105, controlled-environment facility content server 115, non-resident computer 120 resident, non-resident media devices 125, data center 135 (which, as noted, may act as a remote content server), administration system 150, and/or the like. In various embodiments two or more of these computer systems may be configured to communicate with each other in any suitable way, such as, for example, via a network (e.g. as shown in and described above with respect to, FIG. 1).

As illustrated, example computer system 400 includes one or more processors 410 coupled to a system memory 420 via an input/output (I/O) interface 430. Example computer system 400 further includes a network interface 440 coupled to I/O interface 430, and one or more input/output devices 450, such as video device(s) 460 (e.g., a camera), audio device(s) 470 (e.g., a microphone and/or a speaker), and display(s) 480. Computer system 400 may also include a cursor control device (e.g., a mouse or touchpad), a keyboard, etc. Multiple input/output devices 450 may be present in computer system 400 or may be distributed on various nodes of computer system 400. In some embodiments, similar input/output devices may be separate from computer system 400 and may interact with one or more nodes of computer system 400 through a wired or wireless connection, such as over network interface 440.

In various embodiments, computer system 400 may be a single-processor system including one processor 410, or a multi-processor system including two or more processors 410 (e.g., two, four, eight, or another suitable number). Processors 410 may be any processor capable of executing program instructions. For example, in various embodiments, processors 410 may be general-purpose or embedded processors implementing any of a variety of instruction set architectures (ISAs), such as the x86, POWERPC®, ARM®, SPARC®, or MIPS® ISAs, or any other suitable ISA. In multi-processor systems, each of processors 410 may commonly, but not necessarily, implement the same ISA. Also, in some embodiments, at least one processor 410 may be a graphics processing unit (GPU) or other dedicated graphics-rendering device.

System memory 420 may be configured to store program instructions and/or data accessible by processor 410. In various embodiments, system memory 420 may be implemented using any suitable memory technology, such as static random access memory (SRAM), synchronous dynamic RAM (SDRAM), nonvolatile/Flash-type memory, or any other type of memory. As illustrated, program instructions and data implementing certain operations, such as, for example, those described in connection with FIGS. 1 through 3, above, may be stored within system memory 420 as program instructions 425 and data storage 435, respectively. In other embodiments, program instructions and/or data may be received, sent or stored upon different types of computer-accessible media or on similar media separate from system memory 420 or computer system 400. Generally speaking, a computer-readable medium may include any tangible or non-transitory storage media or memory media such as magnetic or optical media—e.g., disk or CD/DVD-ROM coupled to computer system 400 via I/O interface 430, Flash memory, random access memory (RAM), etc. Program instructions and data stored on a tangible computer-accessible medium in non-transitory form may further be transmitted by transmission media or signals such as electrical, electromagnetic, or digital signals, which may be conveyed via a communication medium such as a network and/or a wireless link, such as may be implemented via network interface 440.

In some embodiments, I/O interface 430 may be configured to coordinate I/O traffic between processor 410, system memory 420, and any peripheral devices in the device, including network interface 440 or other peripheral interfaces, such as input/output devices 450. In some embodiments, I/O interface 430 may perform any suitable protocol, timing or other data transformations to convert data signals from one component (e.g., system memory 420) into a format usable by another component (e.g., processor 410). In some embodiments, I/O interface 430 may include support for devices attached through various types of peripheral buses, such as a variant of the Peripheral Component Interconnect (PCI) bus standard or the Universal Serial Bus (USB) standard, for example. In some embodiments, the function of I/O interface 430 may be split into two or more separate components, such as a north bridge and a south bridge, for example. In addition, in some embodiments, some or all of the functionality of I/O interface 430, such as an interface to system memory 420, may be incorporated into processor 410.

Network interface 440 may be configured to allow data to be exchanged between computer system 400 and other devices attached to a network, such as other computer systems, or between nodes of computer system 400. In various embodiments, network interface 440 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

As shown in FIG. 4, memory 420 may include program instructions 425, configured to implement certain embodiments described herein, and data storage 435, comprising various data accessible by program instructions 425. In an embodiment, program instructions 425 may include software elements corresponding to one or more of the various embodiments illustrated in the above figures. For example, program instructions 425 may be implemented in various embodiments using any desired programming language, scripting language, or combination of programming languages and/or scripting languages (e.g., C, C++, C#, JAVA®, JAVASCRIPT®, PERL®, etc.). Data storage 435 may include data that may be used in these embodiments. In other embodiments, other or different software elements and data may be included.

A person of ordinary skill in the art will appreciate that computer system 400 is merely illustrative and is not intended to limit the scope of the disclosure described herein. In particular, the computer system and devices may include any combination of hardware or software that can perform the indicated operations. Additionally, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
receiving, by a controlled-environment facility content server, a digital video file or series of digital image files, directed to a resident of the controlled-environment facility;
converting the video file or series of digital image files into a podcast;
notifying the resident of availability of the podcast; and
streaming and/or downloading, within the controlled-environment facility, the podcast, from the controlled-environment facility content server to a controlled-environment facility resident media device disposed within the controlled-environment facility.

2. The method of claim 1, wherein notifying the resident of the availability of the podcast comprises presenting the podcast as a podcast episode.

3. The method of claim 1, further comprising deleting the podcast from the controlled-environment facility content server following successful streaming and/or downloading of the podcast to the resident media device.

4. The method of claim 1, further comprising hiding the podcast on the resident media device, or deleting the podcast from the resident media device, following viewing of the podcast by the resident on the resident media device.

5. The method of claim 1, wherein the streaming and/or downloading is carried out, at least in part, via Wi-Fi, employing wireless access points, each wireless access point disposed within a portion of the controlled-environment facility and providing access by controlled-environment facility resident media devices disposed in that portion of the controlled-environment facility to streaming and/or downloading of video podcasts.

6. The method of claim 5, wherein the controlled-environment facility is a correctional facility and the portion of the correctional facility is a cellblock, pod, common area, outdoor yard, cafeteria, or exercise facility.

7. The method of claim 1, further comprising:
determining by the controlled-environment facility content server whether the resident is allowed access to the podcast prior to notifying the resident of the availability of the podcast and streaming and/or downloading the podcast;
continuing with the notifying the resident of the availability of the podcast, in response to a determination that the resident is allowed access to the podcast; and
allowing the streaming and/or downloading the podcast in response to the determination that the resident is allowed access to the podcast.

8. The method of claim 1, further comprising:
determining by the resident media device whether the resident is allowed access to the podcast prior to allowing access to the podcast by the resident on the resident media device.

9. The method of claim 1, further comprising:
allowing access to the podcast by the resident media device upon application of security measures with respect to the podcast by the resident media device.

10. The method of claim 8, wherein security measures with respect to the podcast applied by the resident media device comprise determining by the resident media device DNS spoofing, DNS redirection, use of proxy servers for privacy and security, biometric validation, and/or password validation.

11. The method of claim 1, further comprising:
providing a user interface to a non-resident;
receiving a selection by the non-resident, via the user interface, to send video to the resident of the controlled-environment facility;
providing the non-resident, via the user interface, a selection to either upload a video or image or to capture a video or image;
accepting from the non-resident the selection via the user interface to upload the video or image or to capture the video or image;

providing the non-resident, via the user interface, a file selection interface to enter a video or image filename and/or browse for a video or image file, in response to selection by the non-resident to upload a video or image file;

providing the non-resident, via the user interface, a video or image capture interface and capturing a video or image, via the video or image capture interface, in response to selection by the non-resident to capture a video or image;

uploading the selected or recorded video or image for receiving by the controlled-environment facility content server.

12. A controlled-environment facility video distribution system comprising:
   a plurality of controlled-environment facility resident media devices disposed with a controlled-environment facility;
   a controlled-environment facility content server comprising at least one processor and memory coupled to the at least one processor, wherein the memory is configured to store program instructions executable by the at least one processor to cause the controlled-environment facility content server to:
      accept a digital video file or series of digital image files, directed to a resident of the controlled-environment facility;
      convert the video file or series of digital image files into a podcast;
      cache the podcast in controlled-environment facility content server storage;
      notify the resident of availability of the podcast; and
      stream and/or download, within the controlled-environment facility, the podcast to one of the controlled-environment facility resident media devices;
   a network connection linking the controlled-environment facility content server to equipment from which the digital video and/or series of digital image files are uploaded for acceptance by the controlled-environment facility content server, over the network connection; and
   connectivity from the controlled-environment facility content server to the controlled-environment facility resident media devices within the controlled-environment facility, over which the podcast is streamed and/or downloaded to the controlled-environment facility resident media device.

13. The system of claim 12, wherein the program instructions are further executable by the at least one processor to cause the controlled-environment facility content server to delete the podcast from the controlled-environment facility content server following successful streaming and/or downloading of the podcast to the resident media device.

14. The system of claim 12, wherein the connectivity comprises a local area network, wherein Wi-Fi connectivity from a wireless access point disposed in a portion of the controlled-environment facility provides access by controlled-environment facility resident media devices disposed in that portion of the controlled-environment facility.

15. The system of claim 14, wherein a structure of the controlled-environment facility, directionality of Wi-Fi signals, and/or signal strength of the Wi-Fi signals limits Wi-Fi connectivity from the wireless access point disposed in a portion of the controlled-environment facility to provides access by controlled-environment facility resident media devices disposed only in that portion of the controlled-environment facility.

16. The system of claim 15, wherein the controlled-environment facility is a correctional facility and the portion of the correctional facility is a cellblock, pod, common area, outdoor yard, cafeteria, or exercise facility.

17. The system of claim 12, wherein the program instructions are further executable by the at least one processor to cause the controlled-environment facility content server to:
   determine whether the resident is allowed access to the podcast prior to notifying the resident of the availability of the podcast and streaming and/or downloading the podcast and, in response to a determination that the resident is allowed access to the podcast, allow notifying of the resident of the availability of the podcast and streaming and/or downloading of the podcast.

18. The system of claim 12, wherein the resident media device determines whether the resident is allowed to access the podcast, prior to allowing access to the podcast by the resident on the resident media device.

19. The system of claim 12, wherein the resident media device allows access to the podcast upon application of security measures, by the resident media device, with respect to the podcast.

20. The system of claim 19, wherein the security measures with respect to the podcast applied by the resident media device comprise determining by the resident media device DNS spoofing, DNS redirection, use of proxy servers for privacy and security, biometric validation, and/or password validation.

21. The system of claim 12, wherein the resident media device hides the podcast on the resident media device, or deletes the podcast from the resident media device, following viewing of the podcast by the resident on the resident media device.

22. A tangible computer-readable storage medium having program instructions stored thereon that, upon execution by one or more computer systems, cause the one or more computer systems to:
   receive a digital video file or series of digital image files, directed to a resident of the controlled-environment facility;
   convert the video file or series of digital image files into a podcast;
   cache the podcast in non-volatile storage;
   notify the resident of availability of the podcast; and
   stream and/or download the podcast, within the controlled-environment facility, from the controlled-environment facility content server to a controlled-environment facility resident media device disposed within the controlled-environment facility.

23. The tangible computer-readable storage medium of claim 22 wherein the program instructions cause the one or more computer systems to:
   determine whether the resident is allowed access to the podcast prior to notifying the resident of the availability of the podcast and streaming and/or downloading the podcast;
   continue with notifying the resident of the availability of the podcast in response to a determination that the resident is allowed access to the podcast; and
   continue with streaming and/or downloading the podcast in response to the determination that the resident is allowed access to the podcast.

24. The tangible computer-readable storage medium of claim 22 wherein, prior to receiving digital video file or series of digital image files, the program instructions cause the one or more computer systems to:
   present a user a user interface;

receive a selection by the user, via the user interface, to send video to the resident of the controlled-environment facility;
provide the user, via the user interface, a selection to either upload a video or image or to capture a video or image;
accept from the user the selection via the user interface to upload the video or image or to capture the video or image;
provide the user, via the user interface, a file selection interface to enter a video or image filename and/or browse for a video or image file, in response to selection by the user to upload a video or image file;
provide the user, via the user interface, a video or image capture interface and capturing a video or image file, via the video or image capture interface, in response to selection by the user to capture a video or image; and
upload the selected or recorded video or image file for receipt.

* * * * *